United States Patent [19]

Ortel

[11] Patent Number: 5,712,897
[45] Date of Patent: Jan. 27, 1998

[54] FAULT DETECTION IN BROADBAND CABLE SYSTEMS

[75] Inventor: William G. Ortel, New York, N.Y.

[73] Assignee: Nynex Science & Technology, White Plains, N.Y.

[21] Appl. No.: 579,389

[22] Filed: Dec. 27, 1995

[51] Int. Cl.⁶ .......................... H04M 1/24; H04M 3/08; H04M 3/22; H04M 7/10
[52] U.S. Cl. .................. 379/22; 379/1; 379/27; 379/34; 348/6; 348/180; 455/6.1; 370/241
[58] Field of Search .................. 379/6, 9, 10, 12, 379/399, 408, 1, 2, 5, 14–16, 27, 29, 34; 348/6, 10, 12–13, 180, 191–193, 16, 20, 17–18, 186; 370/241–242, 244–245, 247–248, 491, 500, 522, 525–526; 455/3.1, 5.1, 6.1, 6.3

[56] References Cited

U.S. PATENT DOCUMENTS

| | | | |
|---|---|---|---|
| 4,197,496 | 4/1980 | Hiyama | 370/491 |
| 4,521,643 | 6/1985 | Dupuis et al. | 379/6 |
| 4,910,791 | 3/1990 | Dickinson et al. | 379/6 |
| 5,204,862 | 4/1993 | Maher et al. | 370/525 |
| 5,263,021 | 11/1993 | Ortel | 370/491 |
| 5,331,412 | 7/1994 | Farmer et al. | 455/6.1 |
| 5,585,842 | 12/1996 | Chappell et al. | 348/6 |
| 5,635,980 | 6/1997 | Lin et al. | 348/6 |

Primary Examiner—Curtis Kuntz
Assistant Examiner—Binh K. Tieu
Attorney, Agent, or Firm—Loren C. Swingle

[57] ABSTRACT

A fault detection system for a broadband network having a central switch for switched telecommunications connections among subscribers each provided with subscriber interface equipment. The subscriber interface equipment has a received voice path and generates baseband signals for voice telephony which are carried at a carrier frequency on the broadband network. The fault detection system is provided with a tone generator for providing a constant, continuous pilot throughout the network. A pilot tone detector at the subscriber interface equipment detects the absence of pilot tone. The central switch is responsive to each pilot tone detection to recognize the absence of pilot tone at the corresponding subscriber location.

5 Claims, 5 Drawing Sheets

FAULT DETECTION IN BROADBAND CABLE SYSTEMS

BACKGROUND OF THE INVENTION

The present invention relates to cable systems and the automatic detection of faults (such as are caused by breaks) in the networks used in such systems. The invention may be used in conjunction with broadband cable systems over which voice telephony is also provided, such as that described in U.S. Pat. No. 5,351,234 to Beierle et at.

In that system, as described in that patent, a number of subscriber telephones are located at the taps of a CATV system, the telephones communicate over dedicated voice channels with a switch located at the cable head end which acts similarly to a telephone central office. Calls between the telephones of the system or between a system telephone and an external trunk are established selectively by a digital switch at the head end. A single fault that blocks a transmission path in such a system may prevent communication for a large number of subscribers. Also, it has been found that a fault causes the telephones affected to ting and to receive excessive noise.

One prior art system for dealing with the problem of transmission failure in CATV Systems is discussed in U.S. Pat. No. 4,491,978 to Shimp et al. This patent recognizes the importance of fault detection and the difficulty in finding and correcting the faults, i.e. the fact that the equipment in the network is geographically widely dispersed, that failure in the network should be recognized at the headend/co, and the difficulty in replying on subscriber-provided information in problem diagnosis. This makes automation of fault diagnosis a recognized need.

The system described by Shimp et al does address the problem of transmission failure in a cable system. It describes a unit that is attached to an output port of an amplifier and responds to failure of a received pilot signal. When such failure is detected, the unit broadcasts a radio signal outside of the cable system in the vicinity of the amplifier, so that a repair technician equipped with an appropriate receiver can find the location of failure by traveling along the system until the signal is heard.

This differs from the invention in that the cable system described is not two-way. In the invention, moreover, pilot failure is detected at the subscriber interface unit and the failure information is recognized at the head end where it can be more effectively used in failure analysis and dispatch of repair personnel.

Thus it is seen as an object of the invention to automatically detect faults in a CATV system.

It is a further object of the invention therefore to provide fault information at a single location, the headend, where it can be more effectively and efficiently used to address network maintenance and repair.

It is a yet further object of the invention to provide simple inexpensive pilot tone detection equipment at the CATV subscriber interface equipment which informs the head end of a loss of pilot tone.

SUMMARY OF THE INVENTION

The present invention in one embodiment makes the subscriber-cable interface unit (e.g. the unit 500A in the noted patent) sensitive to a failure of the 308 kHz line pilot in the system described in the patent in the VSB demodulator output signal. Upon such failure, the interface unit is inhibited from supplying ringing. Also, the received voice channel is switched to an error-tone generator to indicate that there is a problem and to prevent the subscriber from receiving noise. Further, an off-hook signal is sent to the switch to ensure that the fault is recognized by the switch even when only the forward cable path is blocked.

The effect is to cause a fault to initiate an event at the switch in which every telephone that is blocked by the fault is observed to go off hook at once, with no dialed digits received. Since it is normal for subscribers to occasionally go off hook by accident, a minimum condition must be established to distinguish a fault event. One possible condition would be a minimum number of simultaneous off-hook, no-dial indications. Another possible condition would require simultaneous indications from all the telephone at any one tap.

The locations affected by the fault must be correlated with a system map to determine the most likely fault location. This process may be manual or automatic. The fault information from the switch could be integrated with other monitoring and control systems used for cable maintenance.

If desired, the switch can respond to a fault event by terminating all calls in progress that are affected. A record of this action can be made to provide a basis for a billing adjustment.

The invention should be a very useful supplement to standard methods of monitoring the performance of cable transmission systems. Such monitoring systems typically require expensive devices to be deployed at a few strategic points in the network and monitored over a dedicated cable channel or telephone line. They typically enable a large number of transmission parameters to be observed, but are not as practical for rapid, accurate localization of fault events.

With the invention, the location of a fault can be pinpointed to the closest cable tap. A fault will be detected whether or not the subscribers affected by it are active. If desired, it would be possible to install interface units in locations where no telephone is actually in service in order to aid in fault location.

The fault indication will occur within the time determined by the switch's initial digit timer—typically 15 seconds. Thus, repair efforts can begin with minimal delay.

The features that are added to the interface unit have negligible additional cost. Communication with the central location uses the standard telephone signaling channels.

BRIEF DESCRIPTION OF THE DRAWINGS

These and other objects of the present invention will be understood from the following detailed description of preferred embodiments, and with reference to the appended drawings in which.

DETAILED DESCRIPTION

Figure 1:
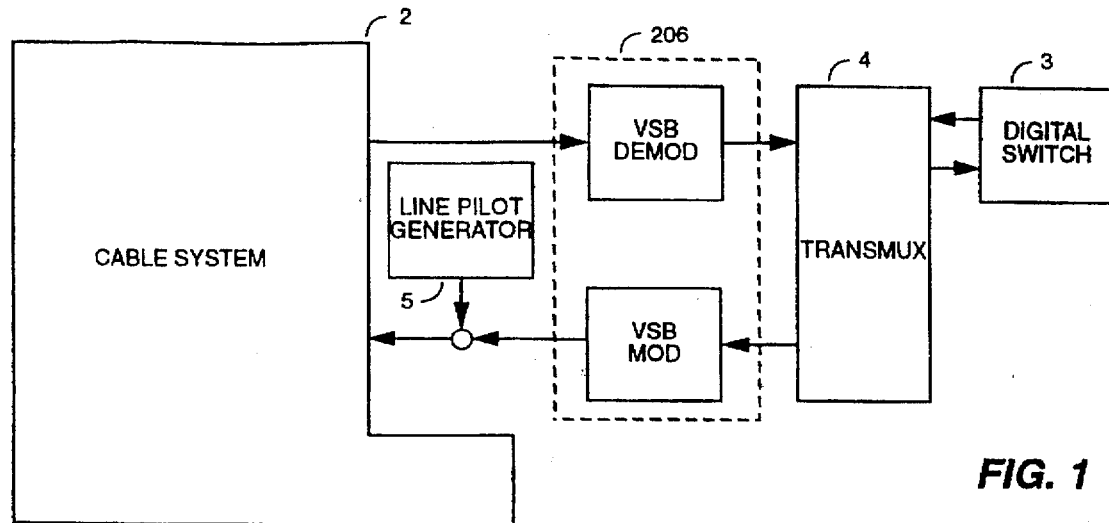
FIG. 1 shows a broadband distribution system having fault detection capabilities in accordance with the principles of the present invention.
Figure 1:
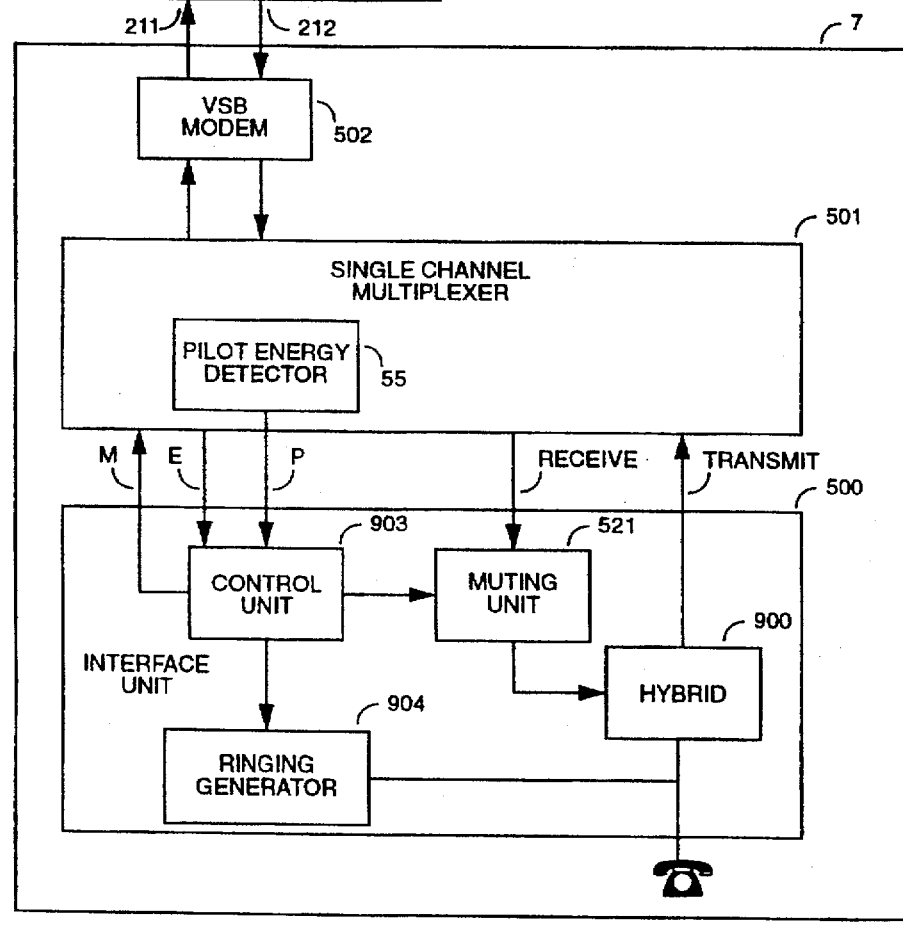

FIG. 1 shows a system of the type shown in U.S. Pat. No. 5,351,234 to Beierle et al., but modified in accordance with the present invention. The system as therein described generally comprises a digital switch 3, Trasmux equipment 4, VSB mod/Demod 2-way equipment group 206 and associated cable network 2 into which the subscriber-based equipment 7 taps at connections 211, 212. The latter equipment 7 comprises VSB modem 502, single channel MUX 501, Interface 500. Interface unit 500 includes a control unit 903, hybrid 900 and ringing generator 904. This equipment functions as described in the Beierle et al patent, and particularly the units 500 and 501 function as described in the specification with respect to FIGS. 9 and 10 of that patent. In FIG. 1 herein, in accordance with the invention, muting unit 521 has been added to interface unit 500 and pilot energy detector 55 is added to MUX 301. Pilot tones are provided to the network by generator 5.

Figure 2:
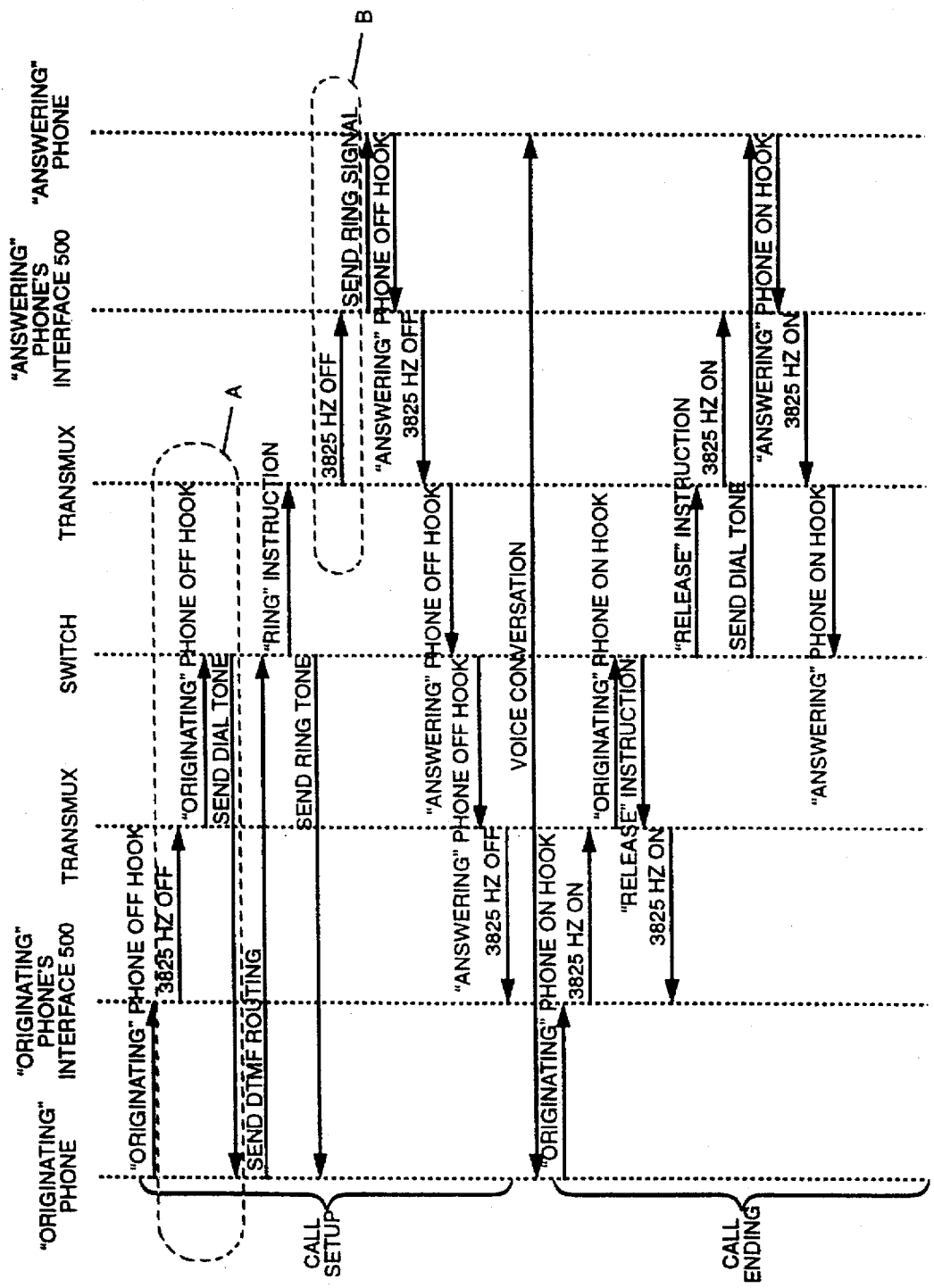
FIG. 2 shows a timing diagram for the operation of the system of FIG. 1 under normal and faulty conditions.

In the prior art when the transmission path in a telephony/CATV system is broken, for example by unplugging a connecting cable, all phones downstream from the break ring because the signaling tone that controls the E lead is off (for phones that were idle at the time of the break). For phones in use at the time, the connection is, of course, broken and the noise level rises. However, the central office switch does not lose the call; it is still in progress if the break is restored. This is as shown in FIG. 2. FIG. 2 shows signaling that indicates fault events. For example, a fault is shown where in the setup mode, the 3825 Hz "off" tone goes off (due to the fault), but without showing offhook (since the phone is not offhook), i.e. without the DTMF routing information sent to the switch ("A" segment in FIG. 2). Thus, to an extent, a fault looks like an originating phone off hook to the switch, but to the affected telephone, it looks like an incoming call requiring answering ("B" segment in FIG. 2).

For some "hot line" applications, it may be good to have the phones ring to alert subscribers to the fact that there is a problem. However, in general it is probably not good to do this. Also, it is probably best to have the switch take down a call in progress.

According to the invention—as shown in FIG. 1, one way to provide a reaction to a fault uses a pilot energy detector 55 in each subscriber-cable interface unit 500 to monitor the line pilot originating at the centralized location: The control unit 903 within the interface unit 500 uses the information from the pilot energy detector 55 (on P line in FIG. 1) to control the ringing generator 904, a muting unit 521 in the receive voice path, and the M lead which sends signaling information upstream.

When the P line signal indicates that the line pilot is present, the control unit 903 functions as previously described. When the P line indicates that there is no received line pilot, the control unit 903 inhibits the ringing generator 904, and blocks the received voice path via the muting unit 521.

With this arrangement, the subscriber is not presented with ringing or noise when there is a fault. Also, the switch 3 receives an indication of off hook, with no dialing, from all telephones downstream of the fault, which shows the location of the fault quite clearly.

This method takes care of the three possible fault conditions in which the fault is in the forward path, the return path, or both:

1. Fault in both forward and return paths - Subscriber-cable interface unit 500 receives off hook because the signaling tone is removed. However, ringing is inhibited because there is no pilot. If the phone is picked up, the receiver is silent. - Switch 3 receives off-hook; applies dial tone, receives no digits, times out.

2. Forward path good, fault in return path. - Switch receiver off-hook; applies dial tone, receives no digits, times out. If the phone should be picked up just after the fault occurs, dial tone is heard. Otherwise there is whatever tone is used to indicate that the phone has been left off hook.

3. Return path good, fault in forward path - Interface unit 500 receives off hook; however, ringing is inhibited because no pilot is received. If phone is picked up, receiver is silent. - Switch 3 receives off hook generated by interface unit 500; applies dial tone, receives no digits, times out.

With this system, subscribers upstream from the fault have normal service. Note that the switch 3 would not normally consider a time-out after dial tone to be an alarm, since a subscriber often will leave a phone off hook. However, the pattern of having a number of such conditions, affecting all stations beyond a certain point, and starting all at once, will be a unique type of event indicating a fault.

It may be desirable to ensure that the subscriber will always be presented with a tone indicating an error when there is a fault. This can be done by switching in a tone generator in the interface unit 500. FIG. 1 shows a muting unit 521, which provides the tone toward the telephone as well as breaking the receive path.

If, as mentioned, it is desired to disconnect calls in progress when there is a fault, the switch 3 can be programmed to do this when it recognizes a fault event.

Since, as mentioned, it is normal for a subscriber to go off hook occasionally with dialing, it is necessary for the switch 3 to make use of some criterion for distinguishing a fault event. One option is to require a minimum number of simultaneous off-hook, no dial indications to qualify a fault event. The number can be chosen by empirical experience. This involves the usual tradeoff between false alarm burdens vs capturing indications of real events. Another option is to recognize a fault event only when all the telephones at one tap were affected.

The purpose of the fault detection system described herein is to produce alarm signals that alert system maintenance personnel to the occurrence of a transmission fault and indicate the fault location to facilitate corrective action. Such alerting and indicating signals may be presented to the maintenance personnel in the same way as for other system alarms, or on the other hand, may be presented over special alerting and indicating interfaces.

Figure 3:
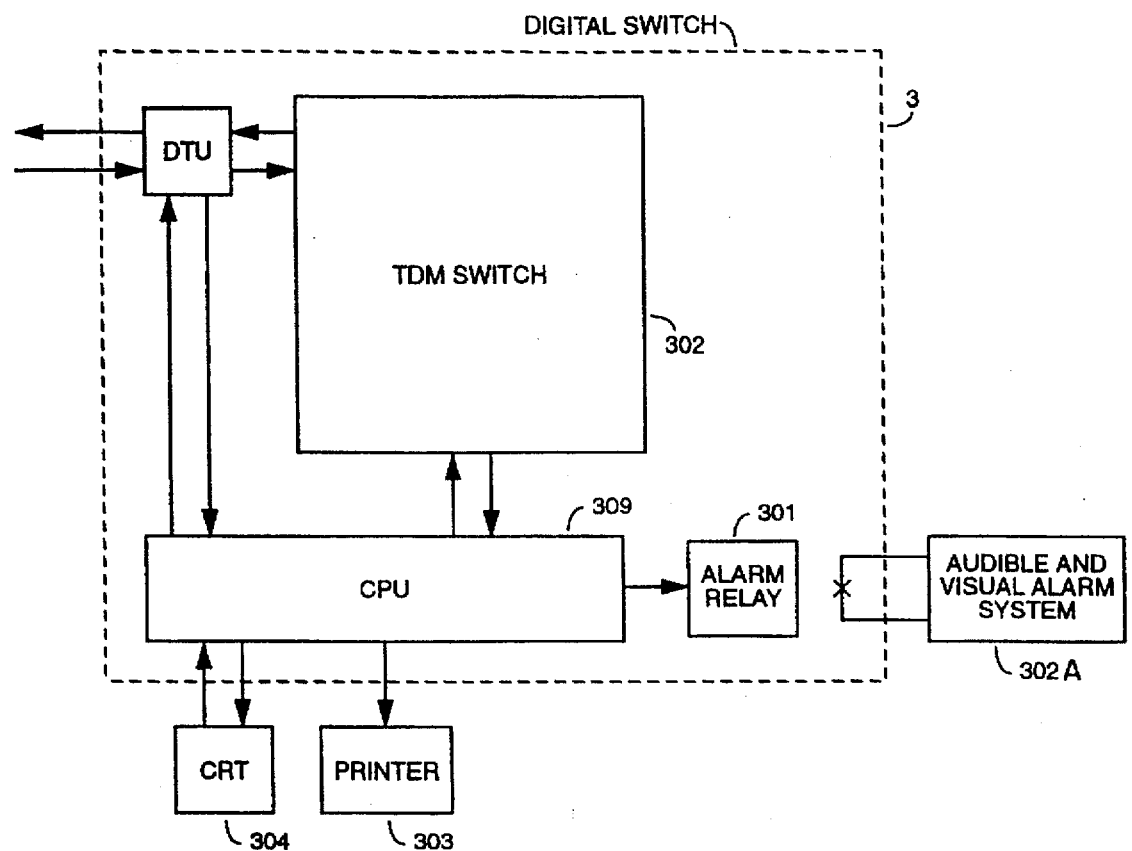
FIG. 3 shows elements and peripheral components of the digital switch of FIG. 1 that are involved in the detection and indication of system faults.

As an example of standard alarm alerting signals, shown in FIG. 3, the Harris switch 302 referred to in U.S. Pat. No. 5,351,234 has alarm relays 301 whose contacts may be wired to actuate bells and lights 302A. As an example of standard indicating signals, the Harris switch has a system printer 303 that produces a one-line description of the problem, generally including the location of the network element affected. A log of these alarm descriptions is maintained electronically in an alarm history file. Alternatively the information can be displayed on CRT display 304.

Harris document 955205, Harris 20-20 Software User's Manual Alarm Control Program, lists from one to 80 specific alarm conditions in 145 categories. Each alarm is assigned one of four severity levels: critical, major, minor, and informational. Most alarms are of the latter three levels, and for these, the user software permits the redefinition of the severity level from its default assignment. The severity level of each alarm determines which alarm relay is actuated and hence, which alerting signal is produced.

To accommodate the system proposed herein to the Harris alerting and indicating scheme, it would be appropriate to modify the Harris alarm control software to define a new alarm category that would be specific to the cable telephony application, to include at least one new alarm condition: simultaneous off-hook, no-dial events on a specified circuit group. This would ideally include a new configuration software capability to define circuit groups for cable telephony. To be most effective, the definition capability should be able to define groups in a nested, hierarchical configuration appropriate to the tree-and-branch cable network topology.

Figure 4:
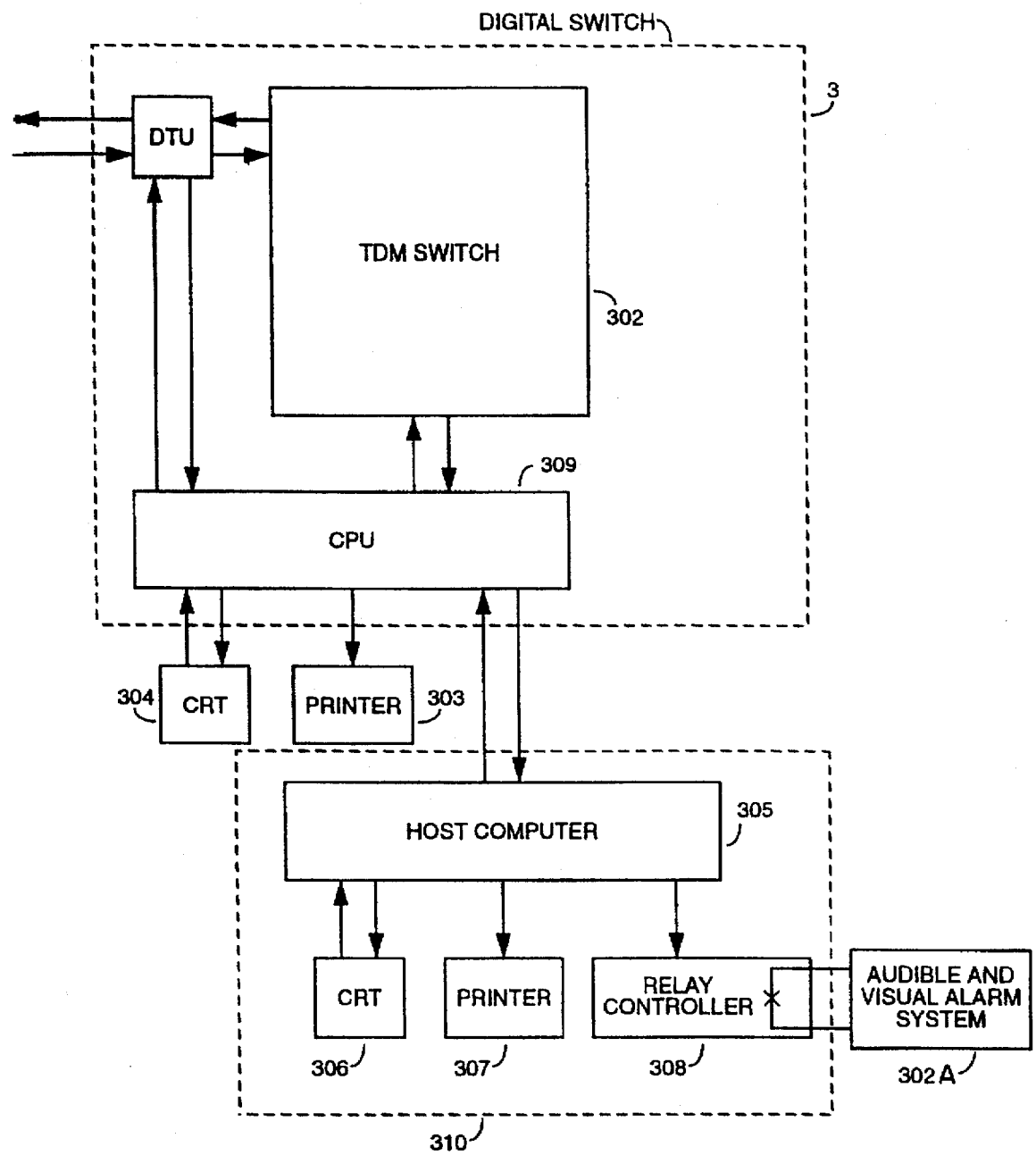
FIG. 4 shows an alternative to the apparatus of FIG. 3 employing a host computer in addition to the digital switch.

In order to provide the new alarm capability without modifying the Harris software, and now referring to FIG. 4, a host computer 305 (and its peripherals 306, 307, 308) can be introduced to control a special alerting and indicating interface 310 used to activate the alarm 302A. The host computer 305 could for example be a micro- or minicomputer.

When an off-hook, no dial call occurs, the Harris switch sends an indication to the host computer in the form of a Call Detail Recording (CDR) record that contains the appropriate information for the host computer to recognize fault conditions according to the principles of the present invention. Further, the host computer can control alarm signals through a relay controller and can indicate fault location through a printed message or a crt display.

Harris document 955204, Call Detail Recording (CDR) User's Manual, explains how to configure the Harris software to produce CDR records with the required information and how to arrange to send such records to an external device, in this case the host computer.

Pilot tone generators and detection circuitry are conventional and have therefore not been described, nor have the details of the muting device 521 whose implementation on the basis of the described functions would be straightforward.

Figure 5:
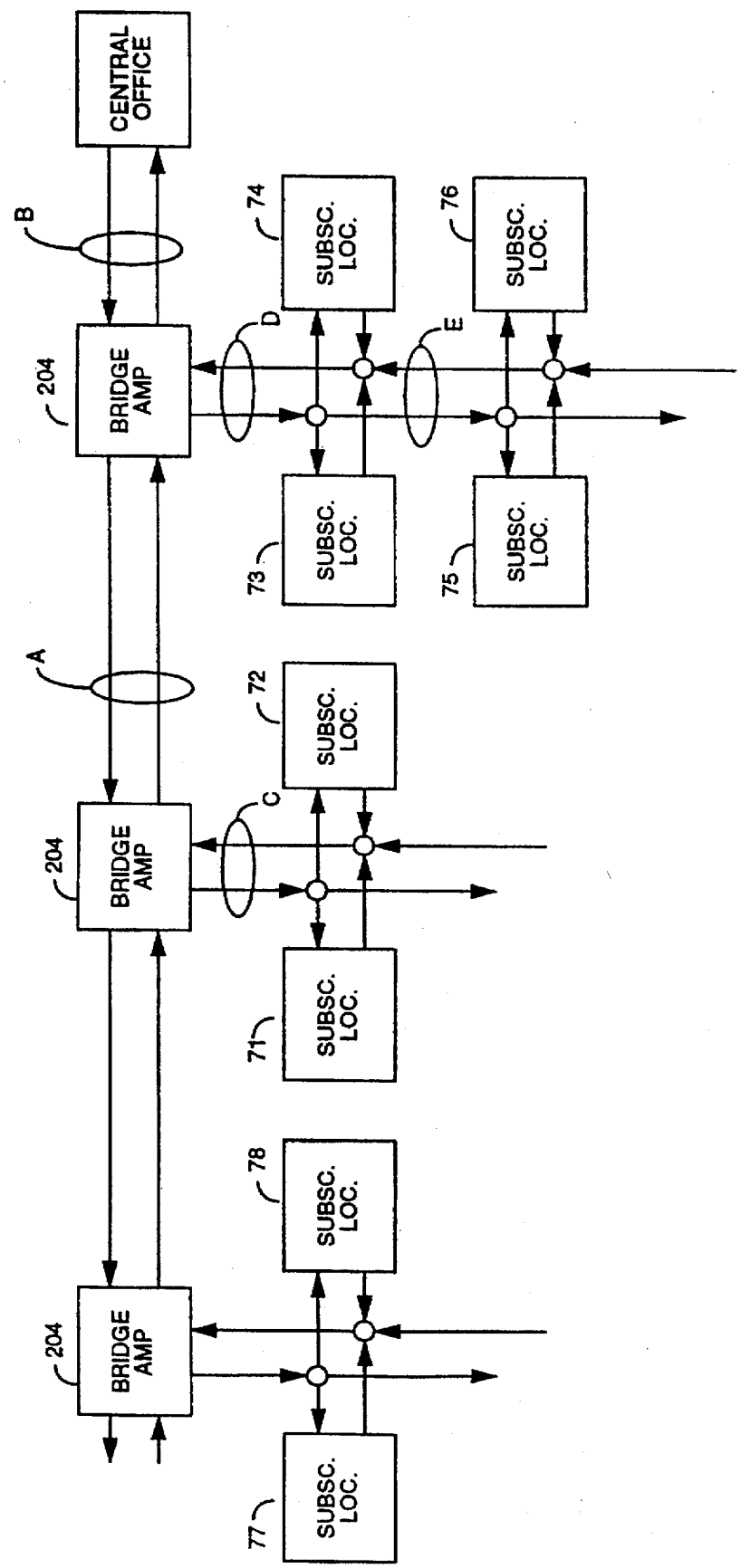
FIG. 5 shows some portions of the system of FIG. 1 in which faults can occur and produce distinctive indications.

FIG. 5 shows the broadband network configuration to illustrate the effect of faults at various locations, shown as A B C D and E in that figure. As mentioned, central office/head end switch 3 recognizes a fault where there is off-hook without DTMF signals being received thus the following table shows how that condition can be used to show fault location:

| Fault Location | Subscriber Location Showing Off-Hook and No DTMF |
| --- | --- |
| B | 71, 72, 73, 74, 75, 76 |
| A | 71, 72, 77, 78 |
| C | 71, 72 |
| D | 73, 74, 75, 76 |
| E | 75, 76 |

It will be apparent to those skilled in the art that further implementations may be realized without departing from the spirit and scope of the invention as described above and with reference to the appended claims.

What is claimed is:

1. A fault detection system for use in a broadband network, said broadband network having a central switch for switched telecommunications connections among subscribers, subscriber interface equipment for each subscriber providing at baseband signals for voice telephony carried at a carrier frequency the broadband network, said subscriber interface equipment having a received voice path, and a network interconnecting the central switch and the subscriber interface equipment, said fault detection system comprising:

a tone generator for providing a constant, continuous pilot throughout said network, pilot tone detection means located at said subscriber interface equipment to indicate the absence of pilot tone at that subscriber, and means responsive to the pilot tone detection means for recognizing at the central switch the absence of pilot tone at the subscriber location.

2. The fault detection system of claim 1 wherein said means responsive to the pilot tone detection means comprises means to determine a pattern of simultaneous off-hook/without subscriber dialing conditions at the subscriber locations.

3. The fault detection system of claim 2 further comprising muting means located at the subscriber interface equipment to block the received voice path of the subscriber interface equipment.

4. The fault detection system of claim 2 wherein said pattern comprises a minimum number of simultaneous off-hook, no-dial indications at the subscriber locations.

5. The fault detection system of claim 2 wherein said pattern comprises simultaneous off-hook, no-dial indications at all the subscriber locations connected to the network through a common bridge.

* * * * *